United States Patent
Qiu et al.

(10) Patent No.: US 11,561,138 B1
(45) Date of Patent: Jan. 24, 2023

(54) RESISTIVE PRESSURE SENSOR WITH IMPROVED STRUCTURE DESIGN

(71) Applicant: RET Equipment Inc., Fremont, CA (US)

(72) Inventors: Yu Qiu, Los Angeles, CA (US); Frank Hu, Cupertino, CA (US)

(73) Assignee: RET EQUIPMENT INC., Fremont, CA (US)

( * ) Notice: Subject to any disclaimer, the term of this patent is extended or adjusted under 35 U.S.C. 154(b) by 0 days.

(21) Appl. No.: 17/851,336

(22) Filed: Jun. 28, 2022

(51) Int. Cl.
*G01L 1/22* (2006.01)

(52) U.S. Cl.
CPC .................. *G01L 1/2293* (2013.01)

(58) Field of Classification Search
None
See application file for complete search history.

(56) References Cited

U.S. PATENT DOCUMENTS

| | | | |
|---|---|---|---|
| 4,252,391 A | 2/1981 | Sado et al. | |
| 4,729,809 A * | 3/1988 | Dery | H05K 3/323 156/298 |
| 5,989,700 A * | 11/1999 | Krivopal | G01L 1/20 524/495 |
| 6,073,497 A * | 6/2000 | Jiang | G01L 1/205 73/862.68 |
| 7,511,702 B2 * | 3/2009 | Hotelling | G06F 3/0414 345/173 |
| 8,669,952 B2 * | 3/2014 | Hashimura | G01L 1/20 345/173 |
| 9,372,588 B2 | 6/2016 | Dietz et al. | |
| 2004/0212599 A1 * | 10/2004 | Cok | G06F 3/045 977/788 |
| 2005/0081640 A1 | 4/2005 | Knowles et al. | |
| 2006/0137462 A1 | 6/2006 | Divigalpitiya et al. | |
| 2009/0237374 A1 | 9/2009 | Li et al. | |
| 2011/0141026 A1 * | 6/2011 | Joquet | H01H 13/703 345/173 |
| 2011/0227836 A1 * | 9/2011 | Li | G06F 3/04144 977/932 |
| 2018/0157364 A1 * | 6/2018 | Frey | G06F 3/04144 |
| 2021/0109615 A1 * | 4/2021 | Hu | G06F 3/045 |

* cited by examiner

*Primary Examiner* — Lisa M Caputo
*Assistant Examiner* — Nigel H Plumb
(74) *Attorney, Agent, or Firm* — Xsensus LLP (57) ABSTRACT

A transparent resistive pressure sensor and method of making the same are disclosed. The transparent resistive pressure sensor may include a flexible pressure substrate, a pressure electrode layer, an elastic dielectric spacer with microstructure, a transparent pressure-sensitive composite layer composed of a transparent polymer dielectric matrix and a conductive one-dimensional nanomaterial oriented substantially in a thickness direction of the transparent pressure-sensitive composite layer, a support electrode layer, and a support substrate, where the elastic dielectric spacer with microstructure may include a transparent elastic dielectric film and a plurality of size-varied straight holes penetrating through the transparent elastic dielectric film in a thickness direction of the transparent elastic dielectric film.

16 Claims, 7 Drawing Sheets

RESISTIVE PRESSURE SENSOR WITH IMPROVED STRUCTURE DESIGN

TECHNICAL FIELD

The present disclosure relates to the technical field of sensors, and particularly relates to a resistive pressure sensor and a method for making the resistive pressure sensor.

BACKGROUND

A pressure sensor is one of the most commonly used sensors today. For example, the pressure sensors have been widely applied in various electronic products such as appliances, televisions, computers, monitors, and portable electronic devices such as mobile phones, smart phones, smart watch, tablet computers, electronic books, portable game consoles, etc. Most recently, a display touchscreen pressure sensor and three-dimension touch pressure sensor have attracted extensive attention.

The pressure sensor typically generates a signal related to an applied force to measure the applied force in a specific area where the force is applied. One type of the most common pressure sensors is based on a conductive pressure-sensitive composite to achieve pressure response. The conductive pressure-sensitive composite relies on tunneling current between conductive particles embedded in an elastic polymer medium to detect pressure such as touch pressure. When the pressure-sensitive composite is compressed by a mechanical load, for example, by a finger, the electrical properties of the pressure-sensitive composite, such as resistance or resistivity, will change in response to an applied pressure. However, the practical application of the pressure-sensitive composite requires the composite to be completely and uniformly compressed in its functional region, thus requiring a large force to achieve its proper function. As a result, the polymer-conductive particle composite lacks the ability to measure the local pressure precisely and accurately and is limited to sensing the existence and difference of the overall force exerted on the composite. In addition, most conductive pressure-sensitive composites lack high optical transparency due to the requirements of the high concentration of the conductive particles and/or long-term durability under repeated deformation, which limits their applications in visual display products. Therefore, there is a need for improved pressure-sensitive composites and pressure sensing devices.

SUMMARY

The present disclosure provides a resistive pressure sensor and a method for making the resistive pressure sensor. The resistive pressure sensor provided may qualitatively measure pressure applied on the sensor and is optically transparent to visible light.

According to a first aspect of the present disclosure, there is provided a resistive pressure sensor, the resistive pressure sensor comprising:

a flexible pressure substrate having a pressure receiving surface and a support substrate facing surface and being parallel to a support substrate;

a pressure electrode layer disposed on the support substrate facing surface of the flexible pressure substrate;

an elastic dielectric layer with porous structure;

a pressure-sensitive composite layer having a first surface facing the pressure electrode layer and a second surface opposite and parallel to the first surface, wherein the pressure-sensitive composite layer comprises a conductive one-dimensional nanomaterial oriented substantially perpendicular to the first surface;

a support electrode layer disposed on a pressure substrate facing surface of the support substrate and facing the pressure electrode layer; and the support substrate, wherein the elastic dielectric layer with porous structure and the pressure-sensitive composite layer are positioned between the pressure electrode layer and the support electrode layer and are optically transparent.

According to a second aspect of the present disclosure, there is provided a transparent resistive pressure sensor, the transparent resistive pressure sensor comprising:

a flexible pressure substrate and a support substrate, the flexible pressure substrate having a pressure receiving surface and a support substrate facing surface and being parallel to the support substrate, the support substrate having a pressure substrate facing surface;

a first electrode disposed on the support substrate facing surface of the flexible pressure substrate and having a support substrate facing surface;

a second electrode disposed on the pressure substrate facing surface of the support substrate and having a pressure substrate facing surface;

a pressure-sensitive composite layer having a first surface and a second surface opposite and parallel to the first surface and positioned between the first electrode and second electrode, the second surface of the pressure-sensitive composite layer facing the support substrate, wherein the pressure-sensitive composite layer comprises a conductive one-dimensional nanomaterial oriented substantially perpendicular to the first surface; and a plurality of elastic dielectric spacers configured to define an insulating gap between the first electrode and the pressure-sensitive composite layer, wherein the transparent pressure sensitive sensor is optically transparent.

According to a third aspect of the present disclosure, there is provided a method of making a pressure-sensitive composite film comprising a transparent polymer dielectric matrix and a conductive one-dimensional nanomaterial uniformly distributed in the transparent polymer dielectric matrix and oriented substantially in a thickness direction of the pressure-sensitive composite film, the method including:

providing a synthetic substrate coated with a releasing layer thereon and providing a polymer precursor solution comprising a liquid precursor of the transparent polymer dielectric matrix and optionally a first volatile solvent;

coating the polymer precursor solution on the releasing layer at room temperature to obtain a liquid precursor film on the releasing layer by using the polymer precursor solution;

heating the liquid precursor film to a first temperature, wherein the first temperature is higher than a boiling point of the first volatile solvent if present and lower than a boiling point of the liquid precursor of the transparent polymer dielectric matrix and a polymerization temperature of the liquid precursor of the transparent polymer dielectric matrix if the liquid precursor of the transparent polymer dielectric matrix is thermally polymerizable;

spraying vertically and uniformly a conductive nanowire suspension including a conductive one-dimensional nanomaterial and a second volatile solvent onto the liquid precursor film to obtain a liquid precursor film embedded with the conductive one-dimensional nanomaterial that is oriented substantially in a thickness direction of the liquid precursor film, wherein a boiling point of the second volatile solvent is lower than the first temperature; and in-situ polymerizing and curing the liquid precursor film embedded with the conductive one-dimensional nanomaterial by irradiating the liquid precursor film embedded with conductive one-dimensional nanomaterial with UV light and then removing the cured liquid precursor film embedded with the conductive one-dimensional nanomaterial from the releasing layer to obtain the pressure-sensitive composite film comprising the conductive one-dimensional nanomaterial oriented substantially in a thickness direction of the pressure-sensitive composite film.

According to a fourth aspect of the present disclosure, there is provided an electronic device comprising the resistive pressure sensor according to the first aspect of the present disclosure.

According to a fifth aspect of the present disclosure, there is provided an electronic device comprising the transparent resistive pressure sensor according to the second aspect of the present disclosure.

Thus, the present disclosure provides a preparation method of an anisotropically oriented nanowire-polymer pressure-sensitive composite film and its applications in a transparent resistive pressure sensor. The pressure-sensitive composite film provided in the present disclosure can be easily fabricated in large area by the disclosed preparation method and has the properties of pressure sensitivity, high optical transparency, and long-term durability. Since one-dimensional conductive nanowires are aligned and arranged along the thickness direction of the pressure-sensitive composite film, its conductivity along the thickness direction of the film is much greater than the conductivity caused by the cross coupling between the nanowires along the direction orthogonal to the thickness direction of the film. Therefore, an ultra-low concentration of conductive nanowires can achieve the effect of high conductivity in the thickness direction of the film, meanwhile, keeping the high optical transparency of the film. The resistive pressure sensor based on the disclosed pressure-sensitive composite film may utilizes a small local mechanical load or pressure to change the contact area between the electrode and the pressure-sensitive composite film to activate different numbers of conductive units comprising nanowire(s), resulting in a large change in the effective local resistance of the output, which greatly improves the signal-to-noise ratio and sensitivity of the resistive pressure sensor.

It should be understood that the above general description and the following detailed description are only exemplary and explanatory and are not restrictive of the present disclosure.

BRIEF DESCRIPTION OF THE DRAWINGS

In order to explain the technical features of embodiments of the present disclosure more clearly, the drawings used in the present disclosure are briefly introduced as follow. Obviously, the drawings in the following description are some exemplary embodiments of the present disclosure. Ordinary person skilled in the art may obtain other drawings and features based on these disclosed drawings without inventive efforts.

It should be noted that like symbols and reference numerals in the various drawings may indicate like elements.

DETAILED DESCRIPTION

The technical solutions and technical features encompassed in the present disclosure will now be described more fully herein in conjunction with the accompanying drawings, in which exemplary embodiments of the disclosure are illustrated. It should be understood that the embodiments disclosed herein are merely examples, each incorporating certain benefits of the present disclosure. Various modifications and alterations may be made to the following examples within the scope of the present disclosure by persons skilled in the art. It should be understood that one or more steps within a method may be executed in different order (or concurrently) without altering the principles of the disclosure. Features of the different embodiments may be combined in different ways to reach yet further embodiments. Accordingly, the scope of the disclosure is to be understood from the entirety of the present disclosure in view of, but not limited to, the embodiments described herein.

Figure 1:
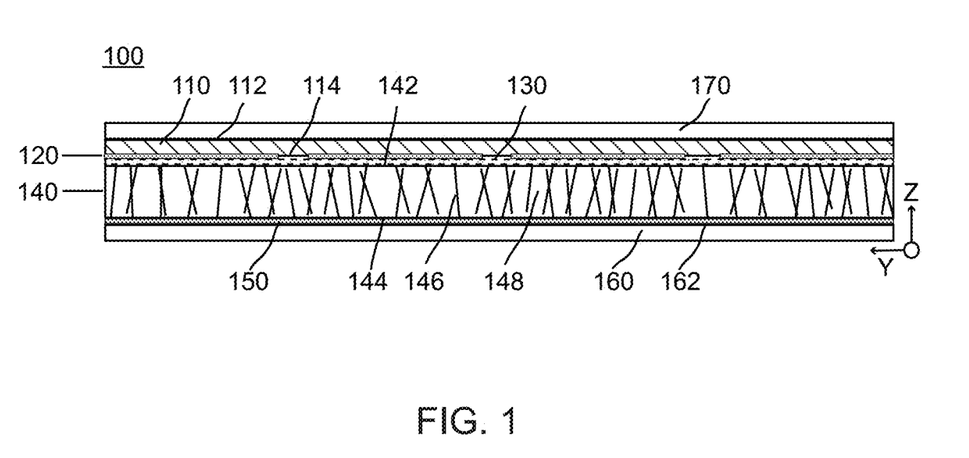
FIG. 1 illustrates a schematic cross-sectional view of a resistive pressure sensor according to some embodiments of the present disclosure.
Figure 2:
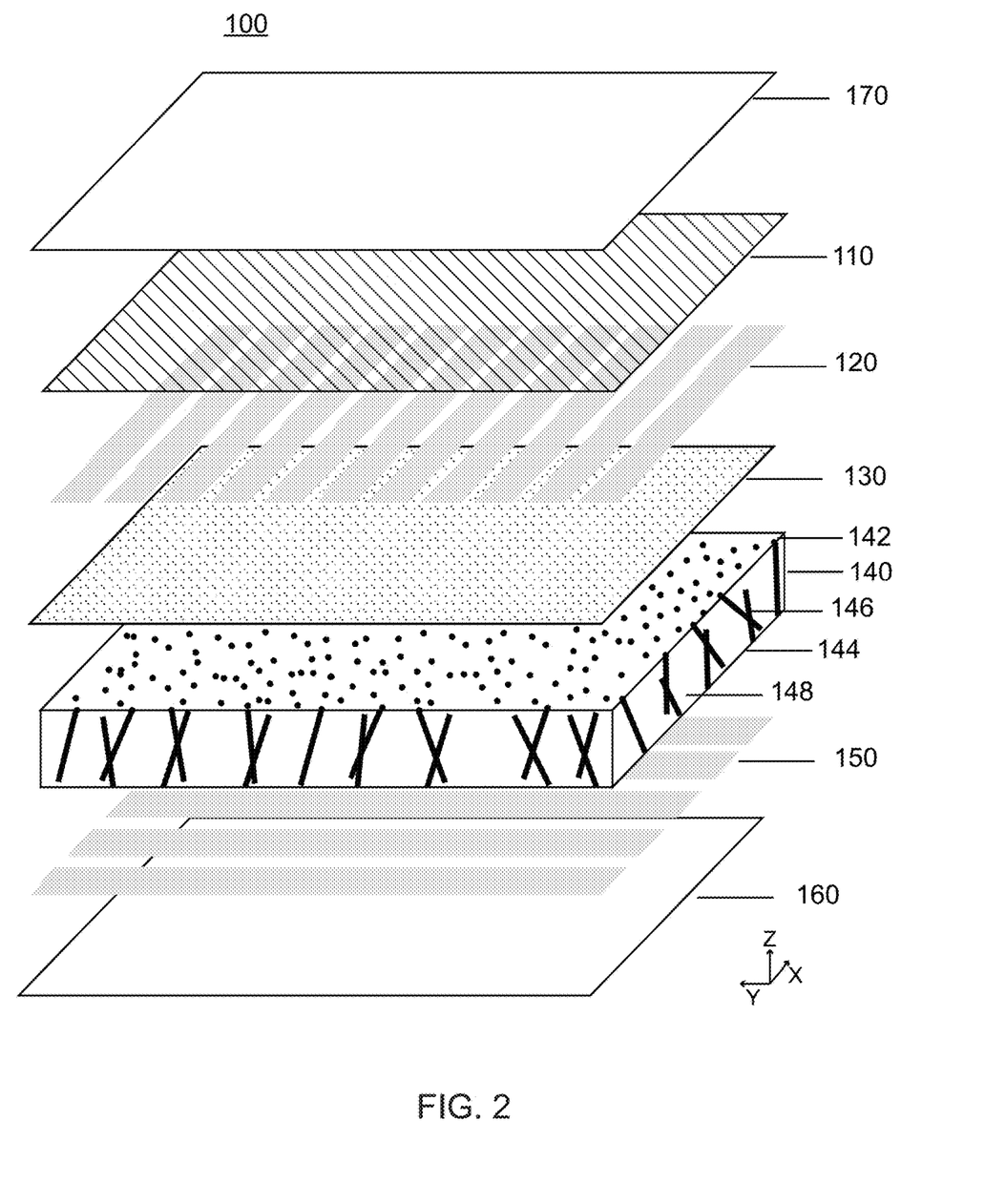
FIG. 2 illustrates an exploded view of the resistive pressure sensor shown in FIG. 1.

FIG. 1 illustrates a schematic cross-sectional view of a resistive pressure sensor 100 according to some embodiments of the present disclosure, and FIG. 2 illustrates an exploded view of the resistive pressure sensor 100 shown in FIG. 1. As shown in FIG. 1 and FIG. 2, in some embodiments, the resistive pressure sensor 100 may include:

- a flexible pressure substrate 110 having a pressure receiving surface 112 and a support substrate facing surface 114 and being parallel to a support substrate 160;
- a pressure electrode layer 120 disposed on the support substrate facing surface 114 of the flexible pressure substrate 110;
- an elastic dielectric layer 130 with porous structure;
- a pressure-sensitive composite layer 140 having a first surface 142 facing the pressure electrode layer 120 and a second surface 144 opposite and parallel to the first surface 142, wherein the pressure-sensitive composite layer comprises a conductive one-dimensional nanomaterial 146 oriented substantially perpendicular to the first surface 142;
- a support electrode layer 150 disposed on a pressure substrate facing surface 162 of the support substrate 160 and facing the pressure electrode layer 120; and the support substrate 160,
wherein the elastic dielectric layer 130 with porous structure and the pressure-sensitive composite layer 140 are positioned between the pressure electrode layer 120 and the support electrode layer 150 and are optically transparent.

The resistive pressure sensor 100 may be applied in a variety of electronic devices having an interactive interface including, but not limited to, a display, a touch screen, a television, a smart phone, a smart watch, a tablet computer, a laptop computer, a remote control, etc. The resistive pressure sensor 100 may detect a mechanic load, such as a touch by a finger, a press by a stylus, or the like, by measuring the amount of local pressure exerted on the resistive pressure sensor 100. Therefore, the resistive pressure sensor 100 can detect not only the location of the mechanic load but also the magnitude of the mechanic load, thus achieving three-dimension pressure sensing.

The flexible pressure substrate 110 may be composed of an optically transparent and flexible material selected from a polyethylene terephthalate (PET), a polyethylene naphthalate (PEN), a colorless polyimide (CPI), a polycarbonate (PC), a polymethylmethacrylate (PMMA), a polystyrene (PS), a polyethersulfone (PES), a polynorbornene (PNB), or glass. The material of the flexible pressure substrate 110 is formulated such that the flexible pressure substrate 110 has sufficient elasticity to permit it to be bent from a resting position under the force levels anticipated to be applied to the pressure receiving surface 112 of the flexible pressure substrate 110 during use and then return to its original resting position once the force is released. The thickness of the flexible pressure substrate 110 may be in a range of 0.01 mm-2 mm. For example, in some embodiments, the flexible pressure substrate 110 may comprise a plastic film with a Young's modulus of 1 GPa-4 GPa. In some embodiments, the flexible pressure substrate 110 may be a PET substrate with the Young's modulus of 2 GPa-2.7 GPa. In some embodiments, the flexible pressure substrate 110 may be a glass sheet with a thickness of 0.01-0.33 mm.

The support substrate 160 may be composed of an optically transparent material selected from a polyethylene terephthalate (PET), a polyethylene naphthalate (PEN), a colorless polyimide (CPI), a polycarbonate (PC), a polymethylmethacrylate (PMMA), a polystyrene (PS), a polyethersulfone (PES), a polynorbornene (PNB), or glass. An elasticity of the support substrate 160 is less than an elasticity of the flexible pressure substrate 110 so that the support substrate 160 does not bend when a pressure force is applied to the flexible pressure substrate 110, which facilitates the contact area between the pressure electrode layer 120 and the pressure-sensitive composite layer 140 varying as a function of the amount of pressure force applied on the flexible pressure substrate 110. For example, when the flexible pressure substrate 110 is a plastic substrate, the support substrate 160 may be glass. When the flexible pressure substrate 110 is a thin material, the support substrate 160 may be a thicker one of the same material, such as 5-10 times thicker than the flexible pressure substrate 110, or another material with a higher Young's modulus. The thickness of the support substrate 160 may be in a range of 0.05 mm-2 mm. For instance, in one embodiment, the flexible pressure substrate 110 may comprise a plastic film with a Young's modulus of 1 GPa-4 GPa, the support substrate 160 may comprise a glass sheet with a Young's modulus of 50 GPa-90 GPa. In another embodiment, the flexible pressure substrate 110 may be a glass sheet with a thickness of 0.01 mm-0.33 mm, the support substrate 160 may comprise a glass sheet with a thickness of 1 mm-2 mm.

In this way, within a defined detection range, a pressure force that bends the flexible pressure substrate will much less effect on the support substrate.

The pressure electrode layer 120 may be optically transparent and comprise a transparent conductive material selected from fluorine doped tin oxide (FTO), indium tin oxide (ITO), indium zinc oxide (IZO), indium tin zinc oxide (ITZO), poly (3,4-ethylenedioxythiophene) polystyrene sulfonate (PEDOT: PSS), carbon nanoparticles, carbon nanotubes, graphene, metal nanoparticles, metal nanowires (such as Ag nanowires), metal nano-grids, metal meshes, conductive polymer nanoparticles, conductive polymer nanopore networks, or mixtures thereof. The pressure electrode layer 120 may be directly coated on the support substrate facing surface 114 of the pressure substrate 110 by, but not limited to, slot die coating, spray coating, Meyer rod coating, blade coating, screen printing, ink jet printing, stamping, etc.

The thickness of the pressure electrode layer 120 may be no more than 200 nm to ensure a high optical transparency. In some embodiments, the thickness of the pressure electrode layer 120 may be in a range of 1 nm to 200 nm, 5 nm to 200 nm, 10 nm to 200 nm, 20 nm to 200 nm, 30 nm to 200 nm, 40 nm to 200 nm, 50 nm to 200 nm, 60 nm to 200 nm, 70 nm to 200 nm, 80 nm to 200 nm, 90 nm to 200 nm, or 100 nm to 200 nm, or within any range defined between any two of the foregoing values, such as 20 nm to 100 nm. In one embodiment, the thickness of the pressure electrode layer 120 is about 150 nm. In another embodiment, the thickness of the pressure electrode layer 120 is about 100 nm. In yet another embodiment, the thickness of the pressure electrode layer 120 is about 50 nm.

In some embodiments, as shown in FIG. 2, the pressure electrode layer 120 may further comprise a plurality of conductive traces parallel to each other and separated by an insulating gap. The pattern of the plurality of conductive traces of the pressure electrode layer 120 may be formed on the pressure electrode layer 120 by, for example, laser ablation, ion beam etching, photolithography, E-beam lithography. The width of each conductive trace is 1 mm-10 mm. The insulating gap between two adjacent conductive traces has a width of 0.1 mm-0.5 mm. The plurality of conductive traces of the pressure electrode layer 120 are extended along a first direction and parallel the first direction, such as along an X direction shown in FIG. 2.

Similarly, the support electrode layer 150 may be optically transparent and comprise a transparent conductive material selected from fluorine doped tin oxide (FTO), indium tin oxide (ITO), indium zinc oxide (IZO), indium tin zinc oxide (ITZO), poly (3,4-ethylenedioxythiophene) polystyrene sulfonate (PEDOT: PSS), carbon nanoparticles, carbon nanotubes, graphene, metal nanoparticles, metal nanowires (such as Ag nanowires), metal nano-grids, metal meshes, conductive polymer nanoparticles, conductive polymer nanopore networks, or mixtures thereof. The support electrode layer 150 may be directly coated on the pressure substrate facing surface 162 of the support substrate 160 by, but not limited to, slot die coating, spray coating, Meyer rod coating, blade coating, screen printing, ink jet printing, stamping, etc.

The thickness of the support electrode layer 150 may be no more than 200 nm to ensure a high optical transparency. In some embodiments, the thickness of the support electrode layer 150 may be in a range of 1 nm to 200 nm, 5 nm to 200 nm, 10 nm to 200 nm, 20 nm to 200 nm, 30 nm to 200 nm, 40 nm to 200 nm, 50 nm to 200 nm, 60 nm to 200 nm, 70 nm to 200 nm, 80 nm to 200 nm, 90 nm to 200 nm, or 100 nm to 200 nm, or within any range defined between any two of the foregoing values, such as 20 nm to 100 nm. In one embodiment, the thickness of the support electrode layer 150 is about 150 nm. In another embodiment, the thickness of the support electrode layer 150 is about 100 nm. In yet another embodiment, the thickness of the support electrode layer 150 is about 50 nm.

In some embodiments, the pressure electrode layer 120 and the support electrode layer 150 may comprise the same type of transparent conductive material. For example, both the pressure electrode layer 120 and the support electrode layer 150 may comprise a same transparent conductive oxide such as fluorine doped tin oxide, indium tin oxide, indium zinc oxide, or indium tin zinc oxide, etc. In other embodiments, the pressure electrode layer 120 and the support electrode layer 150 may comprise different transparent conductive materials. For example, the support electrode layer 150 may comprise a transparent conductive oxide such as fluorine doped tin oxide, indium tin oxide, indium zinc oxide, or indium tin zinc oxide, etc. and the pressure electrode layer 120 may comprise poly (3,4-ethylenedioxythiophene) polystyrene sulfonate (PEDOT: PSS), carbon nanoparticles, carbon nanotubes, graphene, metal nanoparticles, metal nanowires (such as Ag nanowires), metal nano-grids, metal meshes, conductive polymer nanoparticles, conductive polymer nanopore networks, or mixtures thereof, or vice versa. As such, the physical and electric properties of the pressure electrode layer 120 and the support electrode layer 150 may be tuned. For instance, in one embodiment, the support electrode layer 150 may comprise indium tin oxide (ITO), and the pressure electrode layer 120 may comprise a composite comprising metal nanowires such as Ag nanowires.

In some embodiments, as shown in FIG. 2, the support electrode layer 150 may comprise a plurality of conductive traces parallel to each other and separated by an insulating gap. The pattern of the plurality of conductive traces of the support electrode layer 150 may be formed on the support electrode layer 150 by, for example, laser ablation, ion beam etching, photolithography, E-beam lithography. The width of each conductive trace is 1 mm-10 mm. The insulating gap between two adjacent conductive traces has a width of 0.1 mm-0.5 mm. The plurality of conductive traces of the support electrode layer 150 are extended along a second direction and parallel the second direction, such as along a Y direction shown in FIG. 2.

The plurality of conductive traces of the pressure electrode layer 120 and the plurality of conductive traces of the support electrode layer 150 are oriented at an angle to define a plurality of pressure sensing pixels at cross sections of the plurality of conductive traces of the pressure electrode layer 120 and the plurality of conductive traces of the support electrode layer 150, i.e., the first direction and the second direction are different and oriented at the angle. In some embodiments, the plurality of conductive traces of the pressure electrode layer 120 are oriented substantially perpendicular to the plurality of conductive traces of the support electrode layer 150. Each pressure sensing pixel may comprise at least one straight hole of the transparent elastic dielectric film of the elastic dielectric layer 130 and at least one conductive unit of the pressure-sensitive composite layer 140 described in detail below. It is understandable to those skilled in the art that the plurality of conductive traces of the pressure electrode layer 120 and the plurality of conductive traces of the support electrode layer 150 are connected to an external resistance measuring circuitry comprising a multiplexer and a control circuitry to detect a resistance change of each pressure sensing pixel when an external force is exerted on the resistive pressure sensor 100 and a location where the external force is exerted on the resistive pressure sensor 100 during use.

Figure 3:
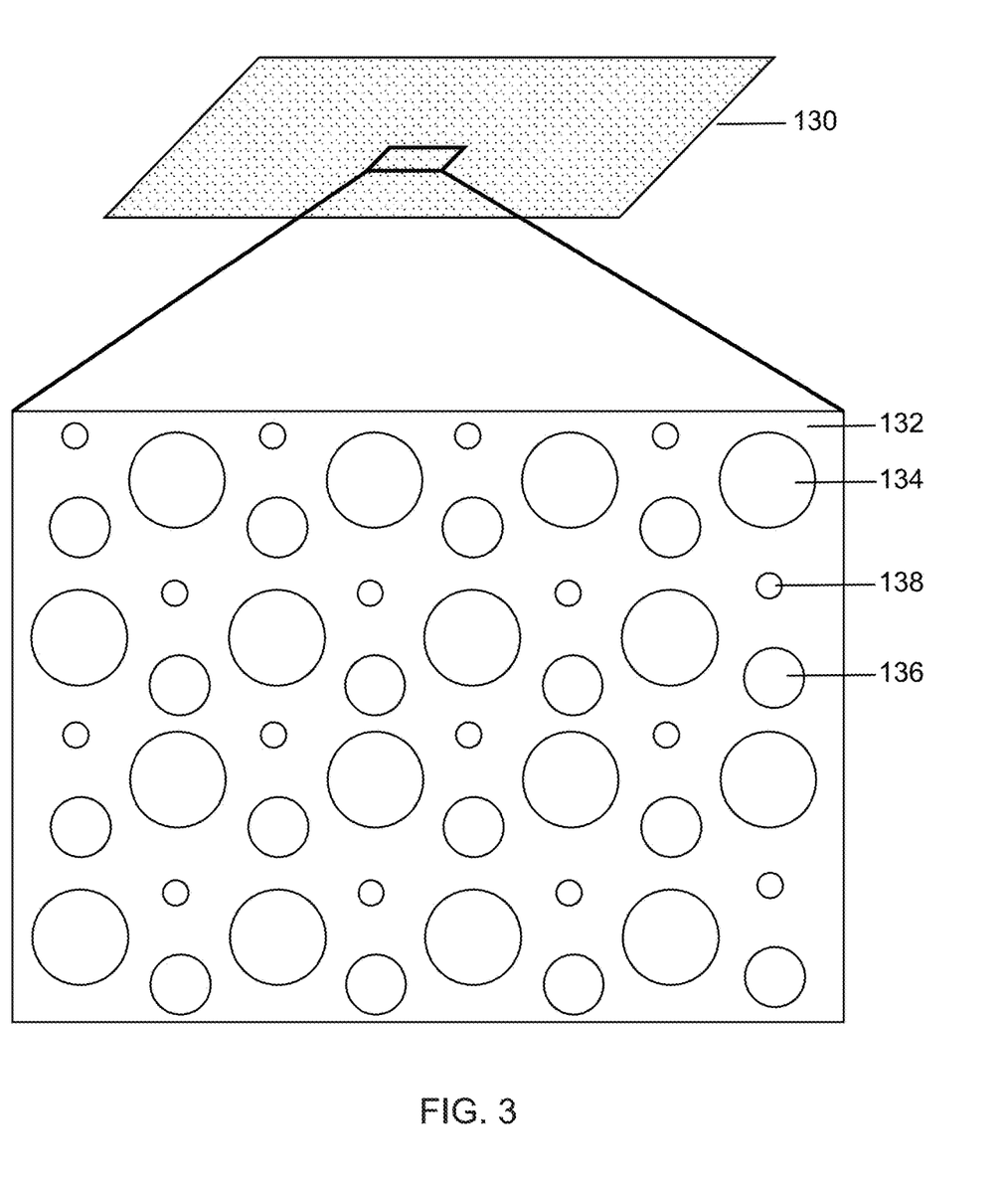
FIG. 3 illustrates a partial enlarged top view of an elastic dielectric layer with porous structure of a resistive pressure sensor according to some embodiments of the present disclosure.
Figure 4:
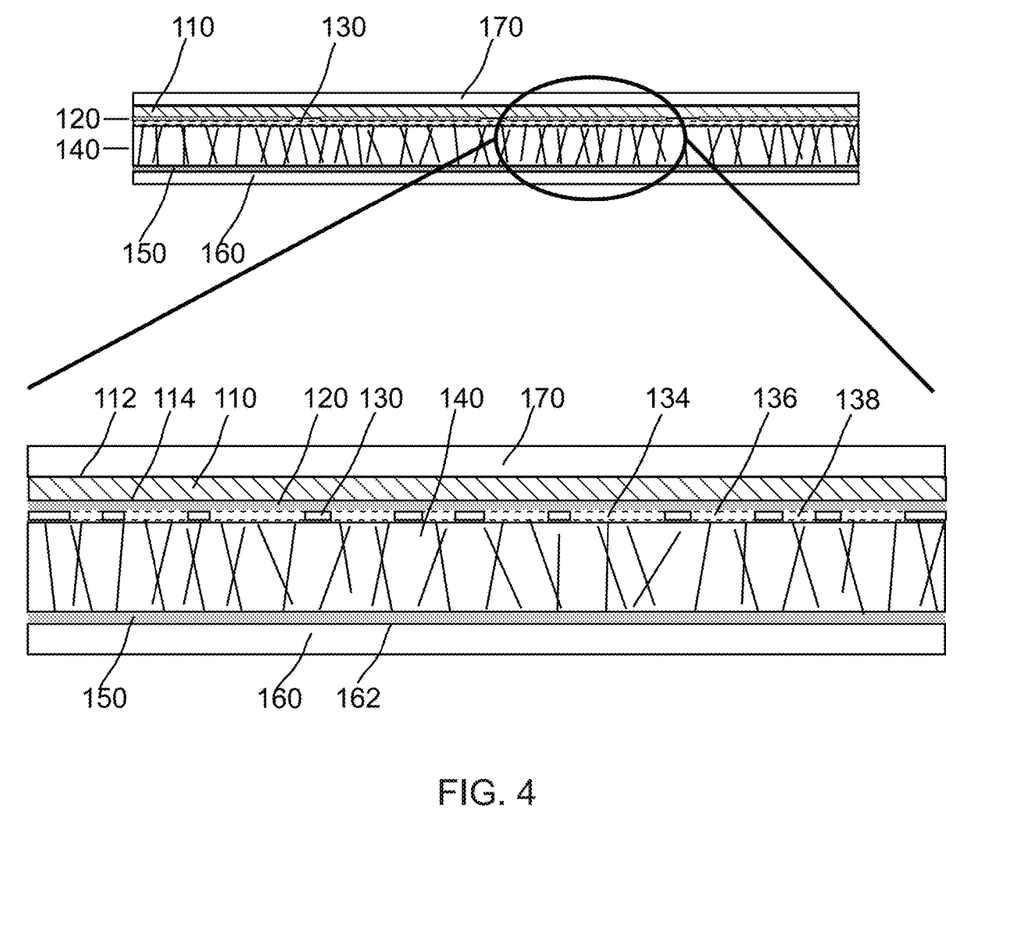
FIG. 4 illustrates a partial enlarged cross-sectional view of a resistive pressure sensor according to some embodiments of the present disclosure.

Please refer to FIG. 3 and FIG. 4. FIG. 3 illustrates a partial enlarged top view of an elastic dielectric layer of a resistive pressure sensor according to some embodiments of the present disclosure. FIG. 4 illustrates a partial enlarged cross-sectional view of a resistive pressure sensor according to some embodiments of the present disclosure. As shown in FIG. 3 and FIG. 4, the elastic dielectric layer 130 may comprise a transparent elastic dielectric film 132 and a plurality of size-varied straight holes 134-138 penetrating through the transparent elastic dielectric film 132 in a thickness direction of the transparent elastic dielectric film 132, i.e., a Z axial direction as shown in FIG. 1, thus forming an elastic dielectric spacer with microstructure.

The plurality of size-varied straight holes 134-138 are uniformly distributed in the transparent elastic dielectric film 132. The transparent elastic dielectric film 132 may comprise an optically transparent elastomer such as polyisoprene, polybutadiene, a polyacrylic elastomer, a silicone elastomer, a fluoroelastomer, a polyurethane elastomer, a styrene-butadiene block copolymer, etc. For example, in some embodiments, the transparent elastic dielectric film 132 may comprise a silicone elastomer, a polyacrylic elastomer, a polyacrylate elastomer, or a mixture thereof. In one embodiment, the transparent elastic dielectric film 132 may comprise polydimethylsiloxane (PDMS). The plurality of size-varied straight holes may be in a shape of prism, a shape of cylinder, or a mixture thereof. Each pressure sensing pixel formed at cross sections of the plurality of conductive traces of the pressure electrode layer 120 and the plurality of conductive traces of the support electrode layer 150 may comprise at least one straight hole. The formation of the size-varied straight holes in the transparent elastic dielectric film 132 may be implemented by photolithography, E-beam lithography, ion beam etching, etc. known in the industry.

The thickness of the transparent elastic dielectric film 132 is in a range of 50 nm-500 nm, 60 nm-500 nm, 70 nm-500 nm, 80 nm-500 nm, 100 nm-500 nm, 200 nm-500 nm, 300 nm-500 nm, or 400 nm-500 nm, or within any range defined between any two of the foregoing values, such as 200 nm-300 nm.

In some embodiments, as shown in FIG. 3 and FIG. 4, each of the plurality of size-varied straight holes 134-138 is a cylindrical hole with a diameter, and the diameter of each cylindrical hole is not less than a thickness of the transparent elastic dielectric film 132. The diameter of the cylindrical hole is in a range of 50 nm-30 microns.

The elastic dielectric layer 130 may be directly attached to the first surface 142 of the pressure-sensitive composite layer 140, i.e., sandwiched between the pressure-sensitive composite layer 140 and the pressure electrode layer 120 as an elastic dielectric spacer. Alternatively, the elastic dielectric layer 130 may be directly attached to the second surface 144 of the pressure-sensitive composite layer 140, i.e., sandwiched between the pressure-sensitive composite layer 140 and the support electrode layer 150 as an elastic dielectric spacer. The elastic dielectric layer 130 with hole structure may be deformed by an external force, and the undeformed state of the elastic dielectric layer can be restored once the external force is removed.

As shown in FIG. 1 and FIG. 2, the pressure-sensitive composite layer 140 has a first surface 142 facing the pressure electrode layer 120 and a second surface 144 opposite and parallel to the first surface and may comprise a transparent polymer dielectric matrix 148 and a conductive one-dimensional nanomaterial 146 oriented substantially perpendicular to the first surface 142. The term "substantially perpendicular to" used herein means an included angle between the longitudinal axis of the conductive one-dimensional nanomaterial and a reference surface such as the first surface 142 is in a range of 70-90 degrees. In other words, the longitudinal axis of the conductive one-dimensional nanomaterial is oriented within 0-20 degrees of the surface normal of the first surface 142. In some embodiments, at least 60% of conductive nanowires embedded in the transparent polymer dielectric matrix 148 are oriented substantially perpendicular to the first surface 142. In some embodiments, at least 70% of conductive nanowires embedded in the transparent polymer dielectric matrix 148 are oriented substantially perpendicular to the first surface 142. In one preferred embodiment, at least 80% of conductive nanowires embedded in the transparent polymer dielectric matrix 148 are oriented substantially perpendicular to the first surface 142.

The conductive one-dimensional nanomaterial 146 may comprise conductive nanowires selected from the group consisting of a metal nanowire, a conductive polymer nanowire, a ceramic conductive nanowire, a carbon nanowire, a single walled carbon nanotube, a multi-walled carbon nanotube, and a mixture thereof. The conductive nanowires are uniformly distributed in the transparent polymer dielectric matrix 148 to form a polymer-conductive nanowire composite and are partially exposed on the first surface and/or the second surface to form non cross-talking and dispersed conductive units. The term "non cross-talking" used herein means that there is no electrical contact between two adjacent conductive units. Each conductive unit may comprise at least one through conductive channel extending from the first surface 142 to the second surface 144 through one single conductive nanowire or multiple conductive nanowires. The conductive units have enough space between each other to ensure that the adjacent conductive units in the same area are isolated by the transparent polymer dielectric medium. Thus, the resistance is low within the conductive units and extremely high between the conductive units, in other words, the pressure-sensitive composite layer 140 has extremely high resistance across the first surface 142 and across the second surface 144, but low resistance within the conductive units across the pressure-sensitive composite layer, i.e., in a thickness direction of the pressure-sensitive composite layer 140. In some embodiments, the conductive units on the first/second surfaces are present at a density from about 1 to $10^5$ conductive units per square microns, preferably from about 10 to $10^5$ conductive units per square microns, more preferably from about $10^2$ to $10^5$ conductive units per square microns, even more preferably from about $10^3$ to $10^5$ conductive units per square microns.

Since the pressure-sensitive composite layer 140 is directly attached to the elastic dielectric layer 130 with porous structure, each overlapping area of the cylindrical hole and the polymer-conductive nanowire composite film may include at least one conductive unit. The larger the diameter of the cylindrical hole is, the greater the number of conductive units in its overlapping area with the polymer conductive nanowire composite film is. As a result, each pressure sensing pixel formed at cross sections of the plurality of conductive traces of the pressure electrode layer 120 and the plurality of conductive traces of the support electrode layer 150 may comprise at least one conductive unit.

The transparent polymer dielectric matrix 148 may comprise a polymer polymerized from a liquid precursor selected from the group consisting of an acrylate, a methacrylate, an acrylic acid, a methacrylic acid, an acrylamide, a methacrylamide, a methylstyrene, a siloxane, silicone ether, an isocyanate, an epoxy, and a mixture thereof. The storage modulus of the transparent polymer dielectric matrix 148 may be in a range of 100 kPa-10 GPa, 1 MPa-10 GPa, 10 MPa-10 GPa, 100 MPa-10 GPa, 500 MPa-10 GPa, 1 GPa-10 GPa, 2 GPa-10 GPa, 3 GPa-10 GPa, 4 GPa-10 GPa, or 5 GPa-10 GPa, or any range defined between any two of the foregoing values, such as 1 GPa-5 GPa, at an ambient temperature.

The Thickness of the transparent polymer dielectric matrix 148 may be in a range of 0.1 microns-10 microns, 0.5 microns-10 microns, 1 micron-10 microns, 2 microns-10 microns, 3 microns-10 microns, 4 microns-10 microns, 5 microns-10 microns, 6 microns-10 microns, 7 microns-10 microns, 8 microns-10 microns, or 9 microns-10 microns, or any range defined between any two of the foregoing values, such as 3 microns-5 microns, The suitable metal nanowire for the conductive one-dimensional nanomaterial 146 may include, but is not limited to, a silver nanowire (Ag nanowire), a copper nanowire, a gold nanowire, a nickel nanowire, a platinum nanowire, a stainless steel nanowire, or a mixture thereof. The suitable conductive polymer nanowire for the conductive one-dimensional nanomaterial 146 may include, but is not limited to, a polypyrrole nanowire/nanotube, a polyaniline nanowire/nanotube, a polythiophene nanowire/nanotube, a poly(3-methylthiothiophene) nanowire/nanotube, a poly(3,4-ethylthiothiophene) nanowire/nanotube, a mixture thereof. The suitable ceramic conductive nanowire for the conductive one-dimensional nanomaterial 146 may include, but is not limited to, an indium tin oxide nanowire/nanotube. The suitable carbon nanotube for the conductive one-dimensional nanomaterial 146 may include a single walled carbon nanotube, a multi-walled carbon nanotube, or a mixture thereof. A diameter of the conductive nanowire suitable for the conductive one-dimensional nanomaterial 146 is in a range of 1 nm-100 nm. A length of the conductive nanowire suitable for the conductive one-dimensional nanomaterial 146 is in a range of 100% to 200% of a thickness of pressure-sensitive composite layer 140. As such, the conductive nanowires embedded in the transparent polymer dielectric matrix 148 and substantially perpendicularly aligned relative to the first/second surface of the pressure-sensitive composite layer 140 may be partially exposed on the first surface and/or the second surface of the pressure-sensitive composite layer 140 to form non cross-talking and dispersed conductive units. Each conductive unit comprises at least one through conductive channel extending from the first surface 142 to the second surface 144 through one single conductive nanowire or multiple conductive nanowires.

When the elastic dielectric layer 130 with porous structure is attached to the first surface 142 of the pressure-sensitive composite layer 140 and sandwiched between the pressure-sensitive composite layer 140 and the pressure electrode layer 120, the support electrode layer 150 is attached to the second surface 144 of the pressure-sensitive composite layer 140 and is directly in electrical contact with the pressure-sensitive composite layer 140 through the conductive units. When the elastic dielectric layer 130 is attached to the second surface 144 of the pressure-sensitive composite layer 140 and sandwiched between the pressure-sensitive composite layer 140 and the support electrode layer 150, the pressure electrode layer 120 is attached to the first surface 142 of the pressure-sensitive composite layer 140 and is directly in electrical contact with the pressure-sensitive composite layer 140 through the conductive units. An elasticity of the pressure-sensitive composite layer 140 is less than an elasticity of the elastic dielectric layer 130.

In some embodiments, the resistive pressure sensor 100 may further include a protection layer 170 disposed on the pressure receiving surface 112 of the flexible pressure substrate 110. The protection layer 170 may be optically transparent and comprise a protective coating. The protective coating may be made of a nanometer thick inorganic coating with high hardness (e.g., silicon oxide, silicon nitride, aluminum oxide, magnesium oxide, zirconium oxide, diamond, transition metal carbides), a nanocomposite comprising inorganic nanoparticles and a polymer resin matrix, a multilayer coating comprising alternating layers of nanometer thick inorganic deposit (e.g., silicon oxide, silicon nitride, aluminum oxide, zirconium oxide, diamond, transition metal carbides) and polymer, or thin glass with high hardness. The application of the protection layer 170 may be slot die coating, gravure coating, Meyer rod coating, blade coating followed by curing under heating or exposure to UV light, atomic layer deposition, chemical vapor deposition, etc. It should be noted that any material used for protection layer 170 should have an elasticity at least matching that of the flexible pressure substrate 110 so that the protection layer 170 may bend with flexible pressure substrate 110 when a pressure force is applied thereon.

Figure 5:
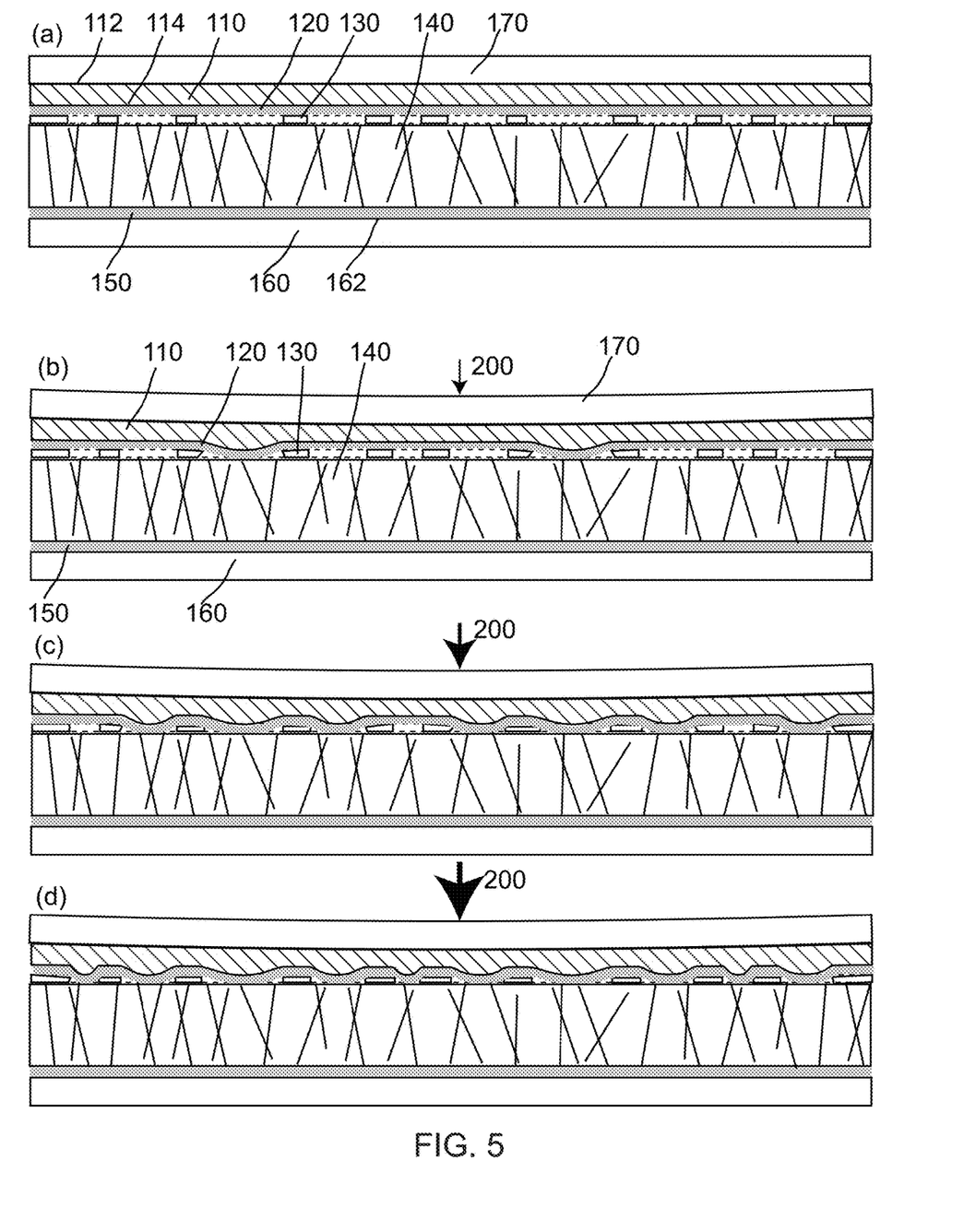
FIG. 5 illustrates schematic cross-sectional views of a resistive pressure sensor operating under different amounts of compressing force according to some embodiments of the present disclosure.

Please refer to FIG. 5, which illustrates schematic cross-sectional views of a resistive pressure sensor 100 operating under different levels of compressing force according to some embodiments of the present disclosure. As shown in panel (a) of FIG. 5, when no external force is applied, the elastic dielectric layer 130 is disposed between the pressure electrode layer 120 and the pressure-sensitive composite layer 140, there is no conduction circuit between the two electrode layers, and the detectable resistance is infinite or extremely large. Under the action of a force 200 (for example, a user presses the pressure receiving surface 112 of the flexible pressure substrate 110 or the protection layer 170 of the flexible pressure substrate 110 through his/her finger or a stylus), the flexible pressure substrate 110 and the pressure electrode layer 120 is bent downward at the touch area. When the level of the force 200 is low and above a threshold, as shown in panel (b) of FIG. 5, the pressure electrode layer 120 makes electrical contact with the pressure-sensitive composite layer 140 through the large-diameter holes of the elastic dielectric layer 130 around the touch area. At least one conductive unit in the deformed large-diameter holes is activated, and the two electrode layers are connected with each other through at least one conductive channel of the at least one conductive unit and forms a closed circuit, resulting that a certain resistance may be detected. When the applied force 200 increases, as shown in panel (c) of FIG. 5, the pressure electrode layer 120 further makes electrical contact with the pressure-sensitive composite layer 140 through the medium-diameter holes of the elastic dielectric layer 130, at least one conductive unit in the medium-diameter holes is activated, more conductive channels between the two electrode layers are connected with each other and form a closed circuit, and the detectable resistance decreases. The greater the applied force 200 is, the pressure electrode layer 120 can make electrical contact with the pressure-sensitive composite layer 140 through the holes of the elastic dielectric layer 130 with more diameters, as shown in panel (d) of FIG. 5; thus, the more conductive channels are activated between the two electrode layers, which are connected with each other through those activated conductive channels and form a closed circuit, the smaller the detectable resistance becomes. As such, the amount and level of the applied force 200 may be qualitatively and accurately measured at the location where the force 200 is applied. In addition, by adjusting the diameters and area ratio of the straight holes on the surface of the elastic dielectric layer 130, the detection range of pressure level and sensitivity of the resistive pressure sensor 100 may be tuned according to actual application requirements.

Figure 6:
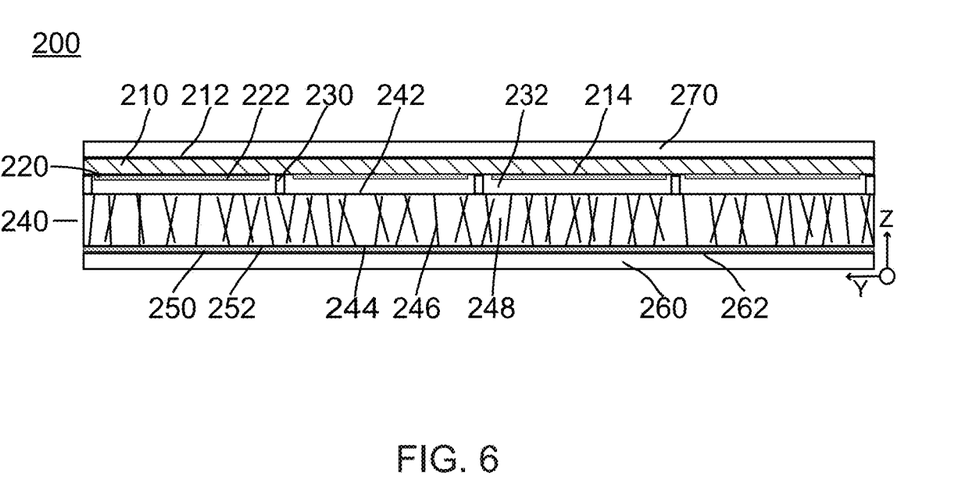
FIG. 6 illustrates a schematic cross-sectional view of a resistive pressure sensor according to some embodiments of the present disclosure.

Please refer to FIG. 6, which illustrates a schematic cross-sectional view of a resistive pressure sensor 200 according to some embodiments of the present disclosure. As shown in FIG. 6, the resistive pressure sensor 200 is optically transparent and may include:

a flexible pressure substrate 210 and a support substrate 260, the flexible pressure substrate 210 having a pressure receiving surface 212 and a support substrate facing surface 214 and being parallel to the support substrate 260, the support substrate 260 having a pressure substrate facing surface 262;

a first electrode 220 disposed on the support substrate facing surface 214 of the flexible pressure substrate 210 and having a support substrate facing surface 222;

a second electrode 250 disposed on the pressure substrate facing surface 262 of the support substrate 260 and having a pressure substrate facing surface 252;

a pressure-sensitive composite layer 240 having a first surface 242 and a second surface 244 opposite and parallel to the first surface 242 and positioned between the first electrode 220 and second electrode 250, the second surface 244 of the pressure-sensitive composite layer 240 facing the support substrate 260, wherein the pressure-sensitive composite layer 240 comprises a conductive one-dimensional nanomaterial 246 oriented substantially perpendicular to the first surface 242; and a plurality of elastic dielectric spacers 230 configured to define an insulating gap 232 between the first electrode 220 and the pressure-sensitive composite layer 240.

The structure and features of the flexible pressure substrate 210 are similar to that of the flexible pressure substrate 110 described above; the structure and features of the support substrate 260 are similar to that of the support substrate 160 described above; the structure and features of the first electrode 220 are similar to that of the pressure electrode layer 120 described above; the structure and features of the second electrode 250 are similar to that of the support electrode layer 150 described above; the structure and features of the pressure-sensitive composite layer 240 are similar to that of the pressure-sensitive composite layer 140 described above. Therefore, for the detail description of the flexible pressure substrate 210, the first electrode 220, the pressure-sensitive composite layer 240, the second electrode 250, and the support substrate 260, reference may be made to the description of each corresponding part described in detail above, which will not be fully repeated herein for conciseness.

For example, the pressure-sensitive composite layer 240 has a first surface 242 facing the first electrode 220 and a second surface 144 opposite and parallel to the first surface 242 and may comprise a transparent polymer dielectric matrix 248 and a conductive one-dimensional nanomaterial 246 oriented substantially perpendicular to the first surface 242. The conductive one-dimensional nanomaterial 246 may comprise conductive nanowires selected from the group consisting of a metal nanowire, a conductive polymer nanowire, a ceramic conductive nanowire, a carbon nanowire, a single walled carbon nanotube, a multi-walled carbon nanotube, and a mixture thereof. The conductive nanowires are uniformly distributed in the transparent polymer dielectric matrix 248 to form a polymer-conductive nanowire composite and are partially exposed on the first surface 242 and/or the second surface 244 to form non cross-talking and dispersed conductive units, where each conductive unit may comprise at least one through conductive channel extending from the first surface 242 to the second surface 244 through one single conductive nanowire or multiple conductive nanowires. The conductive units have enough space between each other to ensure that the adjacent conductive units in the same area are isolated by the transparent polymer dielectric medium. Thus, the resistance is low within the conductive units and extremely high between the conductive units, in other words, the pressure-sensitive composite layer 240 has extremely high resistance across the first surface 242 and across the second surface 244, but low resistance within the conductive units across the pressure-sensitive composite layer 240, i.e., in a thickness direction of the pressure-sensitive composite layer 240. In some embodiments, the conductive units on the first/second surfaces are present at a density from about 1 to $10^5$ conductive units per square microns, preferably from about 10 to $10^5$ conductive units per square microns, more preferably from about $10^2$ to $10^5$ conductive units per square microns, even more preferably from about $10^3$ to $10^5$ conductive units per square microns.

In some embodiments, at least 60% of conductive nanowires embedded in the transparent polymer dielectric matrix 248 are oriented substantially perpendicular to the first surface 242. In some embodiments, at least 70% of conductive nanowires embedded in the transparent polymer dielectric matrix 248 are oriented substantially perpendicular to the first surface 242. In one preferred embodiment, at least 80% of conductive nanowires embedded in the transparent polymer dielectric matrix 248 are oriented substantially perpendicular to the first surface 242.

The transparent polymer dielectric matrix 248 may comprise a polymer polymerized from a liquid precursor selected from the group consisting of an acrylate, a methacrylate, an acrylic acid, a methacrylic acid, an acrylamide, a methacrylamide, a methylstyrene, a siloxane, silicone ether, an isocyanate, an epoxy, and a mixture thereof. The storage modulus of the transparent polymer dielectric matrix 248 may be in a range of 100 kPa-10 GPa, 1 MPa-10 GPa, 10 MPa-10 GPa, 100 MPa-10 GPa, 500 MPa-10 GPa, 1 GPa-10 GPa, 2 GPa-10 GPa, 3 GPa-10 GPa, 4 GPa-10 GPa, or 5 GPa-10 GPa, or any range defined between any two of the foregoing values, such as 1 MPa-500 MPa, at an ambient temperature. In one embodiment, the transparent polymer dielectric matrix 248 has a storage modulus in a range of 1 GPa-5 GPa at an ambient temperature.

The Thickness of the transparent polymer dielectric matrix 248 may be in a range of 0.1 microns-10 microns, 0.5 microns-10 microns, 1 micron-10 microns, 2 microns-10 microns, 3 microns-10 microns, 4 microns-10 microns, 5 microns-10 microns, 6 microns-10 microns, 7 microns-10 microns, 8 microns-10 microns, or 9 microns-10 microns, or any range defined between any two of the foregoing values, such as 3 microns-5 microns, The suitable metal nanowire for the conductive one-dimensional nanomaterial 246 may include, but is not limited to, a silver nanowire (Ag nanowire), a copper nanowire, a gold nanowire, a nickel nanowire, a platinum nanowire, a stainless steel nanowire, or a mixture thereof. The suitable conductive polymer nanowire for the conductive one-dimensional nanomaterial 246 may include, but is not limited to, a polypyrrole nanowire/nanotube, a polyaniline nanowire/nanotube, a polythiophene nanowire/nanotube, a poly(3-methylthiothiophene) nanowire/nanotube, a poly(3,4-ethylthiothiophene) nanowire/nanotube, a mixture thereof. The suitable ceramic conductive nanowire for the conductive one-dimensional nanomaterial 246 may include, but is not limited to, an indium tin oxide nanowire/nanotube. The suitable carbon nanotube for the conductive one-dimensional nanomaterial 246 may include a single walled carbon nanotube, a multi-walled carbon nanotube, or a mixture thereof. A diameter of the conductive nanowire suitable for the conductive one-dimensional nanomaterial 246 is in a range of 1 nm-100 nm. A length of the conductive nanowire suitable for the conductive one-dimensional nanomaterial 246 is in a range of 100% to 200% of a thickness of the pressure-sensitive composite layer 240. As such, the conductive nanowires embedded in the transparent polymer dielectric matrix 248 and substantially perpendicularly aligned relative to the first/second surface of the pressure-sensitive composite layer 240 may be partially exposed on the first surface 242 and/or the second surface 244 of the pressure-sensitive composite layer 240 to form non cross-talking and dispersed conductive units. Each conductive unit comprises at least one through electrically conductive channel extending from the first surface 242 to the second surface 244 through one single conductive nanowire or multiple conductive nanowires.

The plurality of elastic dielectric spacers 230 are separate, optically transparent and arranged between the first electrode 220 and the pressure-sensitive composite layer 240 for connecting the flexible pressure substrate 210 and the support substrate 260 together and providing structural support for the insulating gap 232. The elastic dielectric spacers 230 may comprise a dielectric elastomer such as an acrylic elastomer, a polyurethane elastomer, a silicone elastomer, etc. The elastic dielectric spacers 230 may be a pillar shape with a diameter of 15 microns-100 microns and a height of 1 micron-100 microns. The size, shape, and stiffness of the elastic dielectric spacers 230 may vary according to the elasticity of the flexible pressure substrate 210 and actual applications. The cross section of the elastic dielectric spacers 230 on a x-y plane, i.e., a plane parallel to the first surface 242 of the pressure sensitive composite layer 240, may include, but is not limited to, a circle, an ellipse, a ring, a square, a rectangle, or a regular polygon. The insulating gap 232 may include, but is not limited to, an insulating gas such as nitrogen or air, or a non-volatile insulating fluid such as ethylene glycol, silicone oil, or mineral oil, etc.

As shown in FIG. 6, in some embodiments, the second electrode 250 is attached to the second surface 244 of the pressure-sensitive composite layer 240 and is directly in electrical contact with the pressure-sensitive composite layer 240, the elastic dielectric spacers 230 is attached to the first surface 242 of the pressure-sensitive composite layer 240 and contacts the first electrode 220. When no pressure force is applied to the flexible pressure substrate 210 of the resistive pressure sensor 200, there is an open circuit between the first electrode 220 and the second electrode 250, and an external resistance measuring circuitry cannot detect the resistance due to the open circuit. When a pressure force is applied to the flexible pressure substrate 210, the flexible pressure substrate 210 bends downward, and the elastic dielectric spacers 230 around the pressure area where the pressure force is applied are deformed, so that the first electrode 220 contacts the first surface 242 of the pressure-sensitive composite layer 240, and at least one conductive unit in the pressure-sensitive composite layer 240 and the first electrode 220 are in electrical contact through conductive nanowires partially exposed on the first surface 242. As a result, at least one conductive channel is connected between the first electrode 220 and the second electrode 250, and the resistance measuring circuitry may detect the local resistance of the pressure area where the pressure force is applied. When the applied pressure force increases, the contact area of the first electrode 220 and the pressure-sensitive composite layer 240 on the first surface 242 increases, the first electrode 220 makes electrical contact with more conductive units of the pressure-sensitive composite layer 240, more conductive channels are connected between the first electrode 220 and the second electrode 250, and the resistance detected by the resistance measuring circuitry decreases. When the applied pressure force is removed, the flexible pressure substrate 210 returns to its original position, i.e., the resting position, the electrical contact between the first electrode 220 and the pressure-sensitive composite layer 240 is disconnected, and the open circuit state is restored between the first electrode 220 and the second electrode 250.

Figure 7:
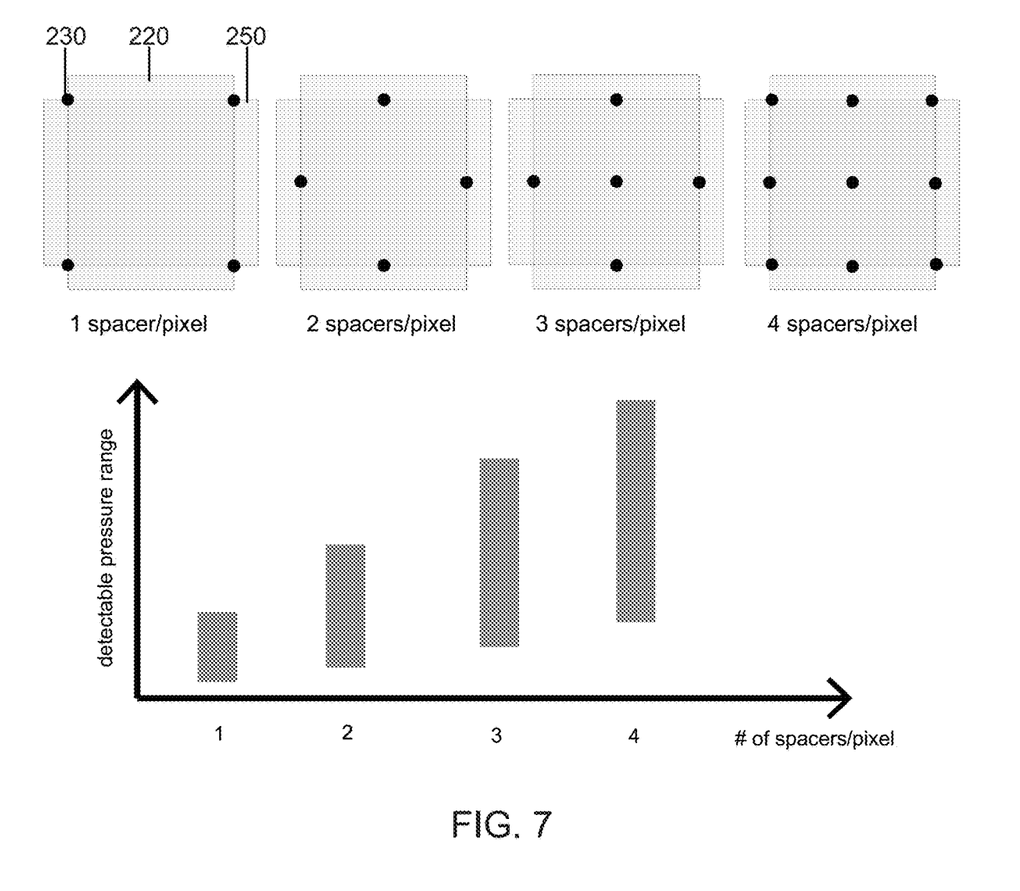
FIG. 7 illustrates schematic diagrams of exemplary dielectric spacer configurations (upper panel) and corresponding detectable pressure ranges thereof (lower panel) of a resistive pressure sensor according to some embodiments of the present disclosure.

Please refer to FIG. 7, which illustrates schematic diagrams of exemplary dielectric spacer configurations in a top view (upper panel) and corresponding detectable pressure ranges thereof (lower panel) of a resistive pressure sensor 200 according to some embodiments of the present disclosure. As shown in FIG. 7, several exemplary dielectric spacer configurations in one pressure sensing pixel formed at the cross section of a conductive trace of the first electrode 220 and a conductive trace of the second electrode 250 are illustrated. It should be noted that the resistive pressure sensor 200 also comprises the pressure-sensitive composite layer 240 (not visible due to its optical transparency in the figure) arranged between the first electrode 220 and the second electrode 250 and the elastic dielectric spacers are disposed between the pressure-sensitive composite layer 240 and the first electrode 220. It should be further noted that, within one pressure sensing pixel, when an elastic dielectric spacer 230 is arrange on the corner of a pixel, the elastic dielectric spacer is counted as ¼ because it is shared with the outside of the pixel; similarly, when an elastic dielectric spacer 230 is arrange on the side edge of a pixel, the elastic dielectric spacer is counted as ½. Thus, the far left dielectric spacer configuration in the upper panel of FIG. 7 comprises one spacer in one pressure sensing pixel, the second dielectric spacer configuration from left in the upper panel of FIG. 7 comprises two spacers in one pressure sensing pixel, the second dielectric spacer configuration from right in the upper panel of FIG. 7 comprises three spacers in one pressure sensing pixel, and the far right dielectric spacer configuration in the upper panel of FIG. 7 comprises four spacers in one pressure sensing pixel. In such ways, the plurality of elastic dielectric spacers 230 may form an elastic dielectric spacer with a predetermined microstructure. Their corresponding detectable pressure ranges are illustrated in the lower panel of FIG. 7. For example, in some embodiments, the pressure sensing pixel of the resistive pressure sensor 200 may comprise the far left dielectric spacer configuration of the upper panel of FIG. 7, when pressure is applied to the pressure sensing pixel, the flexible pressure substrate 210 and the first electrode 220 bend, and the elastic dielectric spacers 230 are deformed. When the pressure reaches a first initial pressure, the first electrode 220 electrically contact at least one conductive unit of the pressure sensing pixel to make the pressure detectable. When the pressure increases, more and more conductive units of the pressure sensing pixel electrically contact with the first electrode till all available conductive units of the pressure sensing pixel electrically contact with the first electrode to reach a first detectable pressure range. Alternatively, the pressure sensing pixel of the resistive pressure sensor 200 may comprise the second from left dielectric spacer configuration of the upper panel of FIG. 7, due to its dielectric spacer configuration, the resistive pressure sensor 200 may possess a second initial pressure and a second detectable pressure range. Or the pressure sensing pixel of the resistive pressure sensor 200 may comprise the second from right dielectric spacer configuration of the upper panel of FIG. 7, and the resistive pressure sensor 200 may possess a third initial pressure and a third detectable pressure range. Or the pressure sensing pixel of the resistive pressure sensor 200 may comprise the far right dielectric spacer configuration of the upper panel of FIG. 7, and the resistive pressure sensor 200 may possess a fourth initial pressure and a fourth detectable pressure range. The first initial pressure is larger the second initial pressure. The second initial pressure is larger than the third initial pressure. The third initial pressure is larger than the fourth initial pressure. Similarly, the first detectable pressure range is larger the second detectable pressure range. The second detectable pressure range is larger than the third detectable pressure range. The third detectable pressure range is larger than the fourth detectable pressure range.

Figure 8:
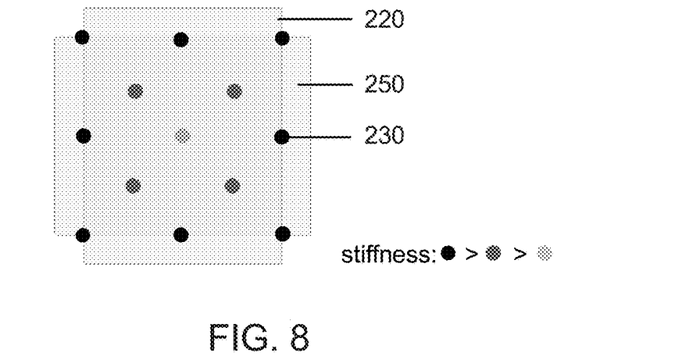
FIG. 8 illustrate a schematic diagram of an exemplary dielectric spacer configuration of a resistive pressure sensor according to some embodiments of the present disclosure.

Please refer to FIG. 8, which illustrate a schematic diagram of another exemplary dielectric spacer configuration of a resistive pressure sensor 200 according to some embodiments of the present disclosure. As shown in FIG. 8, the pressure sensing pixel of the resistive pressure sensor 200 may comprise at least 8 elastic dielectric spacers 230. The at least 8 elastic dielectric spacers 230 may have different stiffnesses. For example, the periphery elastic dielectric spacers of the at least 8 elastic dielectric spacers 230 may have a first stiffness, the elastic dielectric spacers in the inner region of the pressure sensing pixel between the periphery and center may have a second stiffness, and the elastic dielectric spacer in the center of the pressure sensing pixel may have a third stiffness, where the first stiffness is larger than the second stiffness which is larger than the third stiffness. Thus, the plurality of elastic dielectric spacers 230 may form an elastic dielectric spacer with another predetermined microstructure. In this way, the sensitivity, and the detectable pressure range of the resistive pressure sensor 200 may be finely tuned according to actual applications.

In some embodiments, the resistive pressure sensor 200 may further comprise a protection layer 270. The structure and feature of the protection 270 is similar to that of the protection layer 170 disclosed above. Thus, for the detail description of the protection layer 270, reference may be made to the description of the protection layer 170 described in detail above, which will not be repeated herein for conciseness.

The conductive channel of traditional pressure-sensitive composites in the art is composed of conductive particle chains dispersed in a dielectric matrix. The concentration of conductive particles must be higher than the percolation threshold to form a continuous conductive channel, which may significantly reduce the optical transparency of the composite due to the light scattering of conductive particles. On the contrary, the first and second surfaces of the pressure-sensitive composite layer provided by the present disclosure are basically connected through conductive nanowires in the length direction of the conductive nanowires, so only a small number of conductive nanowires are needed to achieve the effect of low resistance, which ensures the high optical transmittance of the pressure-sensitive composite layer.

Traditional pressure-sensitive composites change the spatial arrangement of conductive particles in the dielectric matrix by compression, so as to change the conduction between conductive particles and thus the resistance. The pressure-sensitive composite provided by the present disclosure activates different numbers of conductive units by changing the contact area between the electrode and the surface of the pressure-sensitive composite layer, so as to change the measured resistance across the pressure-sensitive composite layer. In the using process, the pressure sensitive composite layer of the resistive pressure sensor of the present disclosure does not need to be repeatedly deformed, and the conductive nanowires do not need to be repeatedly displaced in the polymer dielectric matrix, which ensures the durability of the pressure-sensitive composite layer. In traditional pressure-sensitive composites, conductive particles are crosslinked to form conductive particle chains. When pressed, the spatial arrangement of conductive particle chains changes, resulting in the change of the overall resistivity of the composite. The conductive units in the pressure-sensitive composite layer provided by the present disclosure are dispersed and discrete, and the locally applied pressure will not affect the detection resistance of other areas. Therefore, the resistive pressure sensor of the present disclosure may be utilized in an electronic system with conventional multi-point touch detection hardware and software to detect and process multi-point touch and applied pressure at different positions at the same time. In a preferred embodiment, the resistive pressure sensor is optically transparent so that it can be combined with a visual display device. However, in other embodiments, the resistive pressure sensor of the present disclosure may be incorporated into other systems or devices that do not require transparency.

The present disclosure further provides a method of making a pressure-sensitive composite film comprising a transparent polymer dielectric matrix and a conductive one-dimensional nanomaterial uniformly distributed in the transparent polymer dielectric matrix and oriented substantially in a thickness direction of the pressure-sensitive composite film, the method including:

providing a synthetic substrate coated with a releasing layer thereon and providing a polymer precursor solution comprising a liquid precursor of the transparent polymer dielectric matrix and optionally a first volatile solvent;

coating the polymer precursor solution on the releasing layer at room temperature to obtain a liquid precursor film on the releasing layer by using the polymer precursor solution;

heating the liquid precursor film to a first temperature, wherein the first temperature is higher than a boiling point of the first volatile solvent if present and lower than a boiling point of the liquid precursor of the transparent polymer dielectric matrix and a polymerization temperature of the liquid precursor of the transparent polymer dielectric matrix if the liquid precursor of the transparent polymer dielectric matrix is thermally polymerizable;

spraying vertically and uniformly a conductive nanowire suspension including a conductive one-dimensional nanomaterial and a second volatile solvent onto the liquid precursor film to obtain a liquid precursor film embedded with the conductive one-dimensional nanomaterial, wherein a boiling point of the second volatile solvent is lower than the first temperature; and in-situ polymerizing and curing the liquid precursor film embedded with the conductive one-dimensional nanomaterial by irradiating the liquid precursor film embedded with conductive one-dimensional nanomaterial with UV light and then removing the cured liquid precursor film embedded with the conductive one-dimensional nanomaterial from the releasing layer to obtain the pressure-sensitive composite film.

The conductive one-dimensional nanomaterial oriented substantially in a thickness direction of the pressure-sensitive composite film means the longitudinal axis of the conductive one-dimensional nanomaterial embedded in the pressure-sensitive composite film is substantially parallel to the thickness direction of the pressure-sensitive composite film, and the included angle between the longitudinal axis of the conductive one-dimensional nanomaterial embedded in the pressure-sensitive composite film and the thickness direction of the pressure-sensitive composite film is in a range of 0-20 degrees. In some embodiments, at least 60% of conductive nanowires embedded in the pressure-sensitive composite film are oriented substantially in the thickness direction of the pressure-sensitive composite film. In some embodiments, at least 70% of conductive nanowires embedded in the pressure-sensitive composite film are oriented substantially in the thickness direction of the pressure-sensitive composite film. In one preferred embodiment, at least 80% of conductive nanowires embedded in the pressure-sensitive composite layer are oriented substantially in the thickness direction of the pressure-sensitive composite film.

The first volatile solvent and the second volatile solvent may be the same as or different from each other and include one or more of water, a volatile alcohol, a volatile ether, tetrahydrofuran, dioxane, a volatile ketone, or a volatile ester.

The conductive one-dimensional nanomaterial may reference to the detailed description of the conductive one-dimensional nanomaterial 146 and 246, which will not be described in detail herein for conciseness. The mass ratio of the conductive one-dimensional nanomaterial to the second volatile solvent is 0.005-0.05 wt %.

The liquid precursor may include a monomer, an oligomer, or a pre-polymer of an acrylate, a methacrylate, an acrylic acid, a methacrylic acid, an acrylamide, a methacrylamide, a methylstyrene, a siloxane, a silicone ether, an isocyanate, an epoxy compound, or a mixture thereof.

Unless otherwise defined, all technical and scientific terms used herein have the same meaning as commonly understood by those skilled in the technical field of the present disclosure. The terms used herein are only for the purpose of describing specific embodiments and are not intended to limit of the disclosure. As used in this disclosure and the appended claims, the singular forms "a," "an," and "the" are intended to include the plural forms as well, unless the context clearly indicates otherwise. It should also be understood that the terms "and" and "or" as used herein refers to and encompasses any or all possible combinations of one or more associated listed items.

The term "about" used herein shall generally mean within 20 percent, preferably within 10 percent, and more preferably within 5 percent of a given value or property. Unless otherwise clear from the context, all numerical values provided herein are modified by the term "about"

The term "optically transparent" used herein when applied to an object means that the object is clear, and light may pass tough the object to be perceived by human eyes. Thus, light in the visible portion of the spectrum may pass through the transparent resistive pressure sensor of the present disclosure to be perceived by human eyes.

It should be noted that in the instant disclosure, relational terms such as "first", "second", "third", etc. are used herein merely to distinguish one entity or operation from another entity or operation without necessarily requiring or implying any such actual relationship or order between such entities or operations. The terms "comprise/comprising", "include/including", "has/have/having" or any other variants thereof are intended to cover non-exclusive inclusion, so that a process, method, article, or device that includes a series of elements includes not only those elements, but also other elements that are not explicitly listed, or also includes elements inherent to such processes, methods, articles, or equipment. If there are no more restrictions, the element defined by the phrase, such as "comprising a . . . ", "including a . . . " does not exclude the presence of additional identical elements in the process, method, article, or equipment that includes the element.

Finally, it should be noted that the above embodiments/examples are only used to illustrate the technical features of the present disclosure, not to limit them; although the present disclosure has been described in detail with reference to the foregoing embodiments and examples, those of ordinary skill in the art should understand that: the technical features disclosed in the foregoing embodiments and examples can still be modified, some or all of the technical features can be equivalently replaced, but, these modifications or replacements do not deviate from the spirit and scope of the disclosure.

What is claimed is:

1. A resistive pressure sensor comprising:
a flexible pressure substrate having a pressure receiving surface and a support substrate facing surface and being parallel to a support substrate;
a pressure electrode layer disposed on the support substrate facing surface of the flexible pressure substrate;
an elastic dielectric spacer with a microstructure;
a pressure-sensitive composite layer having a first surface facing the pressure electrode layer and a second surface opposite and parallel to the first surface, wherein the pressure-sensitive composite layer comprises a conductive one-dimensional nanomaterial oriented substantially perpendicular to the first surface;
a support electrode layer disposed on a pressure substrate facing surface of the support substrate and facing the pressure electrode layer; and
the support substrate,
wherein the elastic dielectric spacer with the microstructure and the pressure-sensitive composite layer are positioned between the pressure electrode layer and the support electrode layer and are optically transparent,
wherein the elastic dielectric spacer with the microstructure is attached to the first surface of the pressure-sensitive composite layer and contacts the pressure electrode layer, and the support electrode layer is attached to the second surface of the pressure-sensitive composite layer and is directly in electrical contact with the pressure-sensitive composite layer; or wherein the elastic dielectric spacer with the microstructure is attached to the second surface of the pressure-sensitive composite layer and contacts the support electrode layer, and the pressure electrode layer is attached to the first surface of the pressure-sensitive composite layer and is directly in electrical contact with the pressure-sensitive composite layer, and wherein the elastic dielectric spacer with the microstructure comprises a transparent elastic dielectric film and a plurality of size-varied straight holes penetrating through the transparent elastic dielectric film in a thickness direction of the transparent elastic dielectric film.

2. The resistive pressure sensor of claim 1, wherein each of the plurality of size-varied straight holes is a cylindrical hole with a diameter, and the diameter of the cylindrical hole is not less than a thickness of the transparent elastic dielectric film.

3. The resistive pressure sensor of claim 2, wherein the thickness of the transparent elastic dielectric film is in a range of 50 nm-500 nm.

4. The resistive pressure sensor of claim 3, wherein the diameter of the cylindrical hole is in a range of 50 nm-30 microns.

5. The resistive pressure sensor of claim 1, wherein the conductive one-dimensional nanomaterial comprises conductive nanowires selected from the group consisting of a metal nanowire, a conductive polymer nanowire, a ceramic conductive nanowire, a carbon nanowire, a single walled carbon nanotube, a multi-walled carbon nanotube, and a mixture thereof.

6. The resistive pressure sensor of claim 5, wherein the pressure-sensitive composite layer further comprises a transparent polymer dielectric matrix, and the conductive nanowires are uniformly distributed in the transparent polymer dielectric matrix and partially exposed on the first surface and/or the second surface to form non cross-talking and dispersed conductive units, wherein each conductive unit comprises at least one through electrically conductive channel extending from the first surface to the second surface through one single conductive nanowire or multiple conductive nanowires.

7. The resistive pressure sensor of claim 6, wherein a length of the conductive nanowire is in a range of 100% to 200% of a thickness of the pressure-sensitive composite layer.

8. The resistive pressure sensor of claim 7, wherein the thickness of the pressure-sensitive composite layer is in a range of 0.1-10 microns.

9. The resistive pressure sensor of claim 7, wherein a diameter of the conductive nanowire is in a range of 1 nm-100 nm.

10. The resistive pressure sensor of claim 6, wherein the transparent polymer dielectric matrix comprises a polymer polymerized from a liquid precursor selected from the group consisting of an acrylate, a methacrylate, an acrylic acid, a methacrylic acid, an acrylamide, a methacrylamide, a methylstyrene, a siloxane, silicone ether, an isocyanate, an epoxy, and a mixture thereof.

11. The resistive pressure sensor of claim 10, wherein the transparent polymer dielectric matrix has a storage modulus of 100 kPa-10 GPa at an ambient temperature.

12. The resistive pressure sensor of claim 1, further comprising a protection layer disposed on the pressure receiving surface of the flexible pressure substrate.

13. The resistive pressure sensor of claim 1, wherein the pressure electrode layer comprises a plurality of conductive traces parallel to each other and separated by an insulating gap, the support electrode layer comprises a plurality of conductive traces parallel to each other and separated by an insulating gap, and the plurality of conductive traces of the pressure electrode layer and the plurality of conductive traces of the support electrode layer are orientated at an angle to define a plurality of pressure sensing pixels at cross sections of the plurality of conductive traces of the pressure electrode layer and the plurality of conductive traces of the support electrode layer.

14. The resistive pressure sensor of claim 1, wherein the pressure electrode layer has a thickness no more than 200 nm, and the support electrode layer has a thickness no more than 200 nm.

15. The resistive pressure sensor of claim 14, the pressure electrode layer and the support electrode layer each comprise a transparent conductive material independently selected from the group consisting of fluorine doped tin oxide (FTO), indium tin oxide (ITO), indium zinc oxide (IZO), indium tin zinc oxide (ITZO), poly (3,4-ethylenedioxythiophene) polystyrene sulfonate (PEDOT: PSS), carbon nanoparticles, carbon nanotubes, graphene, metal nanoparticles, metal nanowires, metal nanogrids, metal meshes, conductive polymer nanoparticles, conductive polymer nanopore networks, and mixtures thereof.

16. The resistive pressure sensor of claim 1, wherein the flexible pressure substrate and support substrate each independently are a polyethylene terephthalate (PET), a polyethylene naphthalate (PEN), a colorless polyimide (CPI), a polycarbonate (PC), a polymethylmethacrylate (PMMA), a polystyrene (PS), a polyethersulfone (PES), a polynorbornene (PNB), or glass.

* * * * *